United States Patent
Zhang et al.

(10) Patent No.: US 11,831,002 B2
(45) Date of Patent: Nov. 28, 2023

(54) SECONDARY BATTERY, BATTERY MODULE, BATTERY PACK, AND ELECTRIC APPARATUS

(71) Applicant: CONTEMPORARY AMPEREX TECHNOLOGY CO., LIMITED, Ningde (CN)

(72) Inventors: Cuiping Zhang, Ningde (CN); Changlong Han, Ningde (CN); Zeli Wu, Ningde (CN); Lei Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/314,120

(22) Filed: May 8, 2023

(65) Prior Publication Data

US 2023/0275204 A1 Aug. 31, 2023

Related U.S. Application Data

(63) Continuation of application No. PCT/CN2022/070054, filed on Jan. 4, 2022.

(51) Int. Cl.
*H01M 4/04* (2006.01)
*H01M 50/46* (2021.01)
(Continued)

(52) U.S. Cl.
CPC .......... *H01M 4/0404* (2013.01); *H01M 4/661* (2013.01); *H01M 10/0525* (2013.01);
(Continued)

(58) Field of Classification Search
None
See application file for complete search history.

(56) References Cited

U.S. PATENT DOCUMENTS

2006/0188785 A1* 8/2006 Inoue .......... H01M 50/46
429/251
2019/0305372 A1* 10/2019 Park .......... H01M 4/587

FOREIGN PATENT DOCUMENTS

CN 101449408 A 6/2009
CN 106415903 A 2/2017
(Continued)

OTHER PUBLICATIONS

International Search Report and Written Opinion received in the corresponding International Application PCT/CN2022/070054, dated Sep. 29, 2022.

*Primary Examiner* — Wyatt P McConnell
(74) *Attorney, Agent, or Firm* — Kilpatrick Townsend & Stockton LLP

(57) ABSTRACT

A secondary battery, including a positive electrode, a negative electrode, a separator sandwiched between the positive electrode and the negative electrode, and an electrolyte are provided. In some embodiments, the positive electrode includes a positive electrode current collector having two main surfaces, the negative electrode includes a negative electrode current collector having two main surfaces, and at least one of the positive electrode current collector and the negative electrode current collector includes at least one recess structure extending from at least one main surface into interior of the current collector, where the recess structure has a recess depth $h_1$ in microns, the electrolyte has a conductivity $\sigma$ in Siemens/meter, and numerically, $\sigma$ and $h_1$ satisfy the following relationship: $8\tanh h_1 + 0.2 h_1 \leq \sigma \leq 10\tanh(h_1)^2 + 2 + 0.1 h_1$. This application further provides a battery module including the foregoing secondary battery, a battery pack, and an electric apparatus.

19 Claims, 3 Drawing Sheets

(51) Int. Cl.
    *H01M 50/204*     (2021.01)
    *H01M 4/66*     (2006.01)
    *H01M 10/0525*     (2010.01)
    *H01M 10/0567*     (2010.01)
    *H01M 10/0568*     (2010.01)
    *H01M 4/02*     (2006.01)

(52) U.S. Cl.
    CPC ... *H01M 10/0567* (2013.01); *H01M 10/0568* (2013.01); *H01M 50/204* (2021.01); *H01M 50/46* (2021.01); *H01M 2004/021* (2013.01)

(56) References Cited

FOREIGN PATENT DOCUMENTS

| | | | |
|---|---|---|---|
| CN | 108615893 A | 10/2018 | |
| CN | 110931869 A | 3/2020 | |
| IN | 202034434 U | 11/2011 | |
| IN | 110998957 A | 4/2020 | |
| JP | 2010118164 A | 5/2010 | |
| JP | 2013110049 A | 6/2013 | |

\* cited by examiner

SECONDARY BATTERY, BATTERY MODULE, BATTERY PACK, AND ELECTRIC APPARATUS

CROSS REFERENCE TO RELATED APPLICATIONS

The present application is a continuation of International Application PCT/CN2022/070054, filed Jan. 4, 2022 and entitled "SECONDARY BATTERY, BATTERY MODULE, BATTERY PACK, AND ELECTRIC APPARATUS", the entire disclosure of which is incorporated herein by reference.

TECHNICAL FIELD

This application pertains to the field of secondary batteries, and more specifically, to a secondary battery of which at least one current collector includes a recess structure, a battery module including the secondary battery, a battery pack including the battery module, and an electric apparatus including the secondary battery, the battery module, or the battery pack.

BACKGROUND

Secondary batteries, also known as rechargeable batteries or storage batteries, are batteries that can be charged after being discharged to activate active substances for continuous use. Main secondary batteries on the market are nickel metal hydride batteries, nickel-cadmium batteries, lead-acid (or lead storage) batteries, lithium-ion batteries, polymer lithium-ion batteries, and the like.

Lithium-ion batteries have been commercialized for about 30 years, and are mainly used in consumer electronics products at first, for example, cameras, notebook computers, and mobile phones. With the growing concern about environmental issues, it is becoming an increasingly urgent need to replace fossil energy with clean energy. In addition, with the advancement of lithium-ion battery technology, lithium-ion batteries have rapidly entered the field of electric vehicles in recent years.

Cells are the core component of lithium-ion batteries, and the service life of cells is the primary factor that consumers consider. Therefore, the development of batteries with long service life is a common pursuit of people. Lithium-ion batteries with high power performance have competitive advantages in vehicle acceleration and energy recovery. However, during long-term charge-discharge cycling of lithium-ion batteries, positive and negative electrode active materials gradually fall off current collectors, seriously affecting the service life and power performance of cells.

SUMMARY

The inventors of this application have invented a novel type of electrode through extensive and in-depth research. This type of electrode not only can slow down and even avoid falling off of electrode active material in long-term cycling, which prevents protective films on surface of current collectors from being compromised, but also improves long service life performance and power performance of cells. Moreover, the electrode becomes lighter, energy density of cells is increased, and fewer electrode current collectors are used, thereby reducing costs.

According to a first aspect of this application, a secondary battery is provided, including a positive electrode, a negative electrode, a separator sandwiched between the positive electrode and the negative electrode, and an electrolyte, where the positive electrode includes a positive electrode current collector having two main surfaces, the negative electrode includes a negative electrode current collector having two main surfaces, and at least one of the positive electrode current collector and the negative electrode current collector includes at least one recess structure extending from at least one main surface into interior of the current collector, where the recess structure has a recess depth $h_1$ in microns, the electrolyte has a conductivity $\sigma$ in Siemens/meter, and numerically, $\sigma$ and $h_1$ satisfy the following relationship: $8\tanh h_1 + 0.2h_1 \leq \sigma \leq 10\tanh(h_1)^2 + 2 + 0.1h_1$.

In some embodiments, a relationship between the recess depth $h_1$ of the recess structure and thickness $h_2$ of the current collector at which the recess structure is located is:

$$0.10 \leq \frac{h_1}{h_2} \leq 0.50,$$

where the recess depth $h_1$ and the thickness $h_2$ of the current collector are expressed in a same unit.

In some embodiments, the recess structure has a recess width W, and a relationship between the recess width W and the recess depth $h_1$ is: $h_1 \leq W \leq 6h_1$, where the recess width W is a linear distance between two points with a largest linear distance on periphery of a cross section that is of the recess structure and that intersects with a main surface of the current collector at which the recess structure is located, and the recess width W and the recess depth $h_1$ are expressed in a same unit.

In some embodiments, the current collector is provided with an electrode active material, and a relationship between a particle size D90 of the electrode active material of the current collector and the recess depth $h_1$ and the recess width W of the recess structure of the current collector is: $h_1 \leq D90 \leq W$, where the particle size D90, the recess depth $h_1$, and the recess width W are expressed in a same unit.

In some embodiments, a relationship between a recess area $A_1$ of the recess structure and a surface area $A_2$ of the current collector at which the recess structure is located is:

$$0.2 \leq \frac{A_1}{A_2} \leq 0.8,$$

where the recess area $A_1$ is a sum of areas of cross sections of all recess structures on the current collector intersecting with the main surface of the current collector, and the recess area $A_1$ and the surface area $A_2$ of the current collector are expressed in a same unit.

In some embodiments, a minimum distance d between a region in which the recess structure is distributed on the surface of the current collector and edge of the current collector satisfies 1 mm $\leq d \leq$ 10 mm.

In some embodiments, the current collector is selected from aluminum foil and copper foil.

In some embodiments, the two main surfaces of the current collector both have a recess structure, and optionally, the recess structures on the two main surfaces are disposed in a staggered manner.

In some embodiments, the recess depth $h_1$ is between 0.9-9.0 μm, optionally 1-8 μm, and optionally 2-7 μm.

In some embodiments, the positive electrode current collector includes a recess structure extending from at least one main surface thereof into interior of the positive electrode current collector.

In some embodiments, the positive electrode current collector includes recess structures extending from the two main surfaces thereof into interior of the positive electrode current collector, and the recess structures on the two main surfaces are optionally disposed in a staggered manner.

In some embodiments, the secondary battery is a lithium-ion battery, and the electrolyte includes a lithium salt and an additive, where the lithium salt is selected from at least one of LiFSI, $LiPF_6$, lithium triflate, tetrafluoroborate, and lithium perchlorate, and optionally, at least one of LiFSI and $LiPF_6$.

In some embodiments, the additive is selected from at least one of the following:

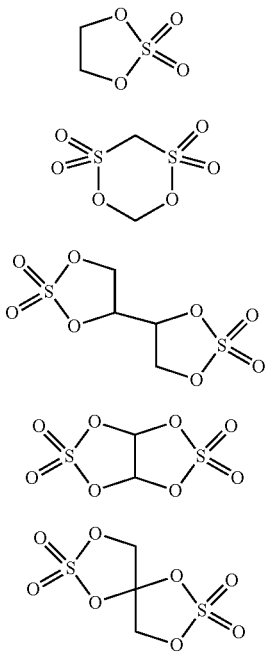

A
B
C
D
E

According to a second aspect of this application, a battery module is provided, including the foregoing secondary battery.

According to a third aspect of this application, a battery pack is provided, including the foregoing battery module.

According to a fourth aspect of this application, an electric apparatus is provided, including at least one of the foregoing secondary battery, battery module, and battery pack.

BRIEF DESCRIPTION OF DRAWINGS

To describe the technical solutions in embodiments of this application more clearly, the following briefly describes the accompanying drawings required for describing the embodiments of this application. Apparently, the accompanying drawings in the following description of the embodiments of this application are merely illustrative, and a person of ordinary skill in the art may still derive other drawings from these accompanying drawings without creative efforts.

DESCRIPTION OF EMBODIMENTS

Figure 1:
FIG. 1 is a cross-sectional view of a current collector having a recess structure according to an embodiment of this application.

The embodiments of this application are further described in detail below. The following detailed description is intended to illustrate the principle of this application, rather than to limit the scope of this application, meaning this application is not limited to the embodiments described herein.

"Ranges" disclosed herein are defined in the form of lower and upper limits. A given range is defined by one lower limit and one upper limit selected, where the selected lower and upper limits define boundaries of that special range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are given herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

In this application, unless otherwise specified, all the embodiments and preferable embodiments mentioned herein can be combined with each other to form new technical solutions.

In this application, unless otherwise specified, all the technical features and preferable features mentioned herein can be combined with each other to form new technical solutions.

In this application, unless otherwise specified, all the steps mentioned herein can be performed sequentially or randomly, and are preferably performed in sequence. For example, a method including steps (a) and (b) indicates that the method may include steps (a) and (b) performed in sequence, or may include steps (b) and (a) performed in sequence. For example, that the method may further include step (c) indicates that step (c) may be added to the method in any order. For example, the method may include steps (a), (b), and (c), or steps (a), (c), and (b), or steps (c), (a), and (b), or the like.

In this application, unless otherwise specified, "include" and "contain" mentioned herein may refer to open or closed inclusion. For example, terms "include" and "contain" can mean that other unlisted components may also be included or contained, or only listed components may be included or contained.

In the descriptions of this specification, it should be noted that "more than" and "less than" are inclusive of the present number and that "more" in "one or more" means two or more than two, unless otherwise specified. In the descriptions of this specification, the terms "first", "second", and "third", and the like are merely for the purpose of description and shall not be understood as any indication or implication of relative importance.

In the descriptions of this specification, unless otherwise stated, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Secondary Battery

During long-term charge-discharge cycling of lithium-ion batteries, positive and negative electrode active materials gradually fall off current collectors, seriously affecting the service life and power performance of cells. In addition, after fresh current collectors (copper foil or aluminum foil) come into contact with air, a protective oxide layer is formed on surface. However, in cold pressing step of making cells, some of electrode active material particles are compressed into the inside of the current collectors (this is especially true for positive electrodes), damaging the protective oxide layer on the surface of the current collectors. Under high temperature and even in long-term cycling, the current collectors are slowly corroded, causing a break of electrode plates, which not only seriously affects cell performance, and may lead to safety issues of cells.

In view of this, this application provides a secondary battery, including a positive electrode, a negative electrode, a separator sandwiched between the positive electrode and the negative electrode, and an electrolyte, where the positive electrode includes a positive electrode current collector having two main surfaces, the negative electrode includes a negative electrode current collector having two main surfaces, and at least one of the positive electrode current collector and the negative electrode current collector includes at least one recess structure extending from at least one main surface into interior of the current collector.

Without wishing to be bound by any particular theory, the inventors argue that if bottom of an active material particle is embedded into the recess structure during coating, a specific bite force is generated by the particle and a pit of the recess structure after drying, alleviating or avoiding fall-off of active particles in middle and late stages of cycling to a great extent. In addition, it can avoid that passivation films on the surface of current collectors are damaged due to compressing of active material particles against the current collector during cold pressing, thereby improving long service life performance of cells.

According to some embodiments of this application, this application provides a secondary battery, including a positive electrode, a negative electrode, a separator sandwiched between the positive electrode and the negative electrode, and an electrolyte, where the positive electrode includes a positive electrode current collector having two main surfaces, the negative electrode includes a negative electrode current collector having two main surfaces, and at least one of the positive electrode current collector and the negative electrode current collector includes at least one recess structure extending from at least one main surface into interior of the current collector, where the recess structure has a recess depth $h_1$ in microns, the electrolyte has a conductivity $\sigma$ in Siemens/meter, and numerically, $\sigma$ and $h_1$ satisfy the following relationship: $8\tanh h_1 + 0.2h_1 \leq \sigma \leq 10\tanh(h_1)^2 + 2 + 0.1h_1$.

The conductivity of the electrolyte can be measured according to relevant standards, such as HG-T 4067-2015. Without wishing to be bound by any particular theory, the inventors argue that after active materials enter interior of the recess structure, a transmission path of lithium ions is longer than a transmission path in a case having no recess structure, and therefore a faster lithium ion transmission speed is required. When the depth of the recess structure and the conductivity satisfy the foregoing relationship, lithium ions can be quickly conducted into active materials in the recess structure, avoiding internal polarization of particles.

In foregoing formula, tanh is a symbol for hyperbolic tangent function, and $$\tanh x = \frac{e^x - e^{-x}}{e^x + e^{-x}}.$$

As mentioned above, any one or two of the positive electrode current collector and the negative electrode current collector may include a recess structure. Specifically, any one or two main surfaces of the positive electrode current collector and/or the negative electrode current collector may include a recess structure. A current collector having a recess structure is described below. For ease of description, in this specification, unless otherwise specified, the "current collector" may refer to the positive electrode current collector and/or the negative electrode current collector, and the two main surfaces of the current collector may be referred to as a first main surface and a second main surface. The current collector may be selected from aluminum foil and copper foil. Usually, aluminum foil is used as the positive electrode current collector, and copper foil is used as the negative electrode current collector. Unless otherwise specified, the "main surface" may refer to the first main surface and/or the second main surface. In some embodiments, the first main surface may be substantially parallel to the second main surface. Unless otherwise specified, an "electrode" may refer to the positive electrode and/or the negative electrode. It should be understood that when both a current collector and a recess structure are mentioned in the following description, the recess structure is a recess structure on the current collector.

A cross section of the recess structure extending from the main surface into the interior of the current collector is not particularly limited. The cross section is a section parallel to the main surface of the current collector. For example, the cross section of the recess structure intersecting with the main surface of the current collector may be circular, elliptical, semicircular, triangular, square, rectangular, trapezoidal, star-shaped, polygonal, irregular, or the like. A longitudinal section perpendicular to the cross section of the recess structure is not particularly limited. For example, the longitudinal section may be rectangular, triangular, trapezoidal, arched, irregular, or the like. In some embodiments, the recess structure is cylindrical. In some embodiments, the recess structure is cone-shaped. In some embodiments, the recess structure is prism-shaped. In some embodiments, the recess structure is hemispherical.

In some embodiments, the recess structure extending from the main surface into the interior of the current collector has a recess depth $h_1$, a relationship between the recess depth $h_1$ and thickness $h_2$ of the current collector may be as follows:

$$0.10 \le \frac{h_1}{h_2} \le 0.50,$$

where the recess depth $h_1$ and the thickness $h_2$ of the current collector are expressed in a same unit. For example, $$\frac{h_1}{h_2}$$

includes but is not limited to 0.10, 0.20, 0.30, 0.40, 0.50, and a range formed by using any two of the foregoing values as endpoints. The recess depth is a maximum distance from the main surface of the current collector to the bottom of the recess structure. For example, for a cylindrical recess structure, the recess depth is a distance from the main surface of the current collector to the bottom surface of the cylinder. For a cone-shaped recess structure, the recess depth is a distance from the apex of the cone to the main surface of the current collector. In some embodiments, the recess depth $h_1$ is within a range of 0.9-9.0 μm, optionally 1-8 μm, and optionally 2-7 μm. For example, the recess depth $h_1$ includes but is not limited to 0.9 μm, 1.0 μm, 1.2 μm, 1.4 μm, 1.6 μm, 1.8 μm, 2.0 μm, 2.2 μm, 2.4 μm, 2.6 μm, 2.8 μm, 3.0 μm, 3.2 μm, 3.4 μm, 3.6 μm, 3.8 μm, 4.0 μm, 4.2 μm, 4.4 μm, 4.6 μm, 4.8 μm, 5.0 μm, 5.2 μm, 5.4 μm, 5.6 μm, 5.8 μm, 6.0 μm, 6.2 μm, 6.4 μm, 6.6 μm, 6.8 μm, 7.0 μm, 7.2 μm, 7.4 μm, 7.6 μm, 7.8 μm, 8.0 μm, 8.2 μm, 8.4 μm, 8.6 μm, 8.8 μm, 9.0 μm, and a range formed by using any two of the foregoing values as endpoints. In some embodiments, the thickness $h_2$ of the current collector is within a range of 9.0-18.0 μm, and includes but is not limited to 9.5 μm, 10.0 μm, 10.5 μm, 11.0 μm, 11.5 μm, 12.0 μm, 12.5 μm, 13.0 μm, 13.5 μm, 14.0 μm, 14.5 μm, 15.0 μm, 15.5 μm, 16.0 μm, 16.5 μm, 17.0 μm, 17.5 μm, and a range formed by using any two of the foregoing values as endpoints. The recess depth $h_1$ and the thickness $h_2$ of the current collector may be measured using methods known in the art. For example, section analysis of the current collector may be carried out according to JY/T010-1996, and online measurement may be performed. The inventors have found that when the depth $h_1$ of the recess structure and the thickness $h_2$ of the current collector satisfy the foregoing relationship, adhesion (bite force) between the current collector and active materials is the largest, effectively suppressing fall-off of active materials in long-term cycling.

In some embodiments, the recess structure has a recess width W, and a relationship between the recess width W and the recess depth $h_1$ may be: $h_1 \le W \le 6h_1$, where the recess width W is a linear distance between two points with a largest linear distance on periphery of a cross section that is of the recess structure and that intersects with a main surface of the current collector, and the recess width W and the recess depth $h_1$ are expressed in a same unit. For example, when the cross section of the recess structure intersecting with the main surface of the current collector is a rectangle or square, the recess width W is the length of a diagonal of the rectangle; when the cross section of the recess structure intersecting with the main surface of the current collector is a circle, the recess width W is the diameter of the circle; when the cross section of the recess structure intersecting with the main surface of the current collector is a triangle, the recess width W is the length of the longest side of the triangle. In some embodiments, the recess width W may optionally be $h_1$, $1.5h_1$, $2.0h_1$, $2.5h_1$, $3.0h_1$, $3.5h_1$, $4.0h_1$, $4.5h_1$, $5.0h_1$, $5.5h_1$, $6h_1$, or a range formed by using any two of the foregoing values as endpoints. In some embodiments, the recess width W is in within a range of 0.9-54.0 μm, and includes but is not limited to 1.0 μm, 1.5 μm, 2.0 μm, 2.5 μm, 3.0 μm, 3.5 μm, 4.0 μm, 4.5 μm, 5.0 μm, 5.5 μm, 6.0 μm, 6.5 μm, 7.0 μm, 7.5 μm, 8.0 μm, 8.5 μm, 9.0 μm, 9.5 μm, 10.0 μm, 12.0 μm, 14.0 μm, 16.0 μm, 18.0 μm, 20.0 μm, 22.0 μm, 24.0 μm, 26.0 μm, 28.0 μm, 30.0 μm, 32.0 μm, 34.0 μm, 36.0 μm, 38.0 μm, 40.0 μm, 42.0 μm, 44.0 μm, 46.0 μm, 48.0 μm, 50.0 μm, 52.0 μm, and a range formed by using any two of the foregoing values as endpoints. The recess width W may be obtained from surface morphology analysis performed according to JY/T010-1996, and may be measured online. The inventors have found that when the width and depth of the recess structure satisfy the foregoing relationship, active material particles come into good effective contact with the current collector, so that electrons can be quickly conducted, thereby reducing polarization of electrodes and improving service life of cells.

In some embodiments, the electrode further includes an electrode active material on the current collector. The electrode active material is on the first main surface and/or the second main surface of the current collector. It can be understood that a positive electrode active material is provided on the first main surface and/or the second main surface of the positive electrode current collector, and that a negative electrode active material is provided on the first main surface and/or the second main surface of the negative electrode current collector. In some embodiments, a relationship between a particle size D90 of the electrode active material and the recess depth $h_1$ and the recess width W may be: $h_1 \le D90 \le W$, where the particle size D90, the recess depth $h_1$, and the recess width W are expressed in a same unit. D90 is a corresponding particle size where the cumulative distribution by number reaches 90% as counted from the small particle size side. To be specific, in the electrode active material, the number of particles with a particle size smaller than D90 accounts for 90% of the total number of particles. In some embodiments, the particle size D90 of the electrode active material is in within a range of 0.9-54.0 μm, and includes but is not limited to 1.0 μm, 1.5 μm, 2.0 μm, 2.5 μm, 3.0 μm, 3.5 μm, 4.0 μm, 4.5 μm, 5.0 μm, 5.5 μm, 6.0 μm, 6.5 μm, 7.0 μm, 7.5 μm, 8.0 μm, 8.5 μm, 9.0 μm, 9.5 μm, 10.0 μm, 12.0 μm, 14.0 μm, 16.0 μm, 18.0 μm, 20.0 μm, 22.0 μm, 24.0 μm, 26.0 μm, 28.0 μm, 30.0 μm, 32.0 μm, 34.0 μm, 36.0 μm, 38.0 μm, 40.0 μm, 42.0 μm, 44.0 μm, 46.0 μm, 48.0 μm, 50.0 μm, 52.0 μm, and a range formed by using any two of the foregoing values as endpoints. D90 may be measured according to GB/T19077-2016. The inventors have found that when the particle size D90 of the electrode active material, the recess depth $h_1$, and the recess width W satisfy the foregoing relationship, the recess structure matches positive electrode material particles, ensuring advantages of the recess structure can be fully utilized.

In some embodiments, a relationship between a recess area $A_1$ and a surface area $A_2$ of the current collector may be:

$$0.2 \le \frac{A_1}{A_2} \le 0.8,$$

where the recess area $A_1$ is a sum of areas of cross sections of all recess structure intersecting with the main surface of the current collector, and the recess area $A_1$ and the surface area $A_2$ of the current collector are expressed in a same unit. For example, in some embodiments, the recess area $A_1$ and the surface area $A_2$ of the current collector are in centimeters. In some embodiments, $$\frac{A_1}{A_2}$$

includes but is not limited to 0.2, 0.3, 0.4, 0.5, 0.6, 0.7, 0.8, and a range formed by using any two of the foregoing values as endpoints. The inventors have found that when the area $A_1$ of each recess structure of the current collector and the surface area $A_2$ of the current collector satisfy the foregoing relationship, fall-off of active materials in long-term cycling can be substantially suppressed.

In some embodiments, a minimum distance d between a region in which the recess structure is distributed on the surface of the current collector and edge of the current collector may be within the following range: 1 mm≤d≤10 mm. The minimum distance between the region in which the recess structure is distributed on the surface of the current collector and edge of the current collector may be determined as follows: observing cross sections that are of all recess structures adjacent to the edge of the current collector and that intersect with the main surface of the current collector, and finding out a point on the periphery of the cross sections that is closest to the edge of the current collector, where a shortest distance between the point and the edge of the current collector is the minimum distance d. d may be measured in method known in the art, and for example, may be measured with a scale. In some embodiments, d includes but is not limited to 1 mm, 2 mm, 3 mm, 4 mm, 5 mm, 6 mm, 7 mm, 8 mm, 9 mm, 10 mm, and a range formed by using any two of the foregoing values as endpoints. For the current mainstream winding assembly, outer electrode plates at two ends in an axial direction usually break first during winding and later use of batteries, which affects service life of cells.

Figure 2:
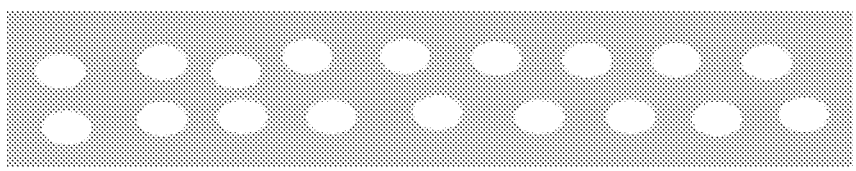
FIG. 2 is a top view of the current collector in FIG. 1.

FIG. 1 is a sectional view of an example current collector according to an embodiment of this application, which shows a schematic diagram of a recess structure of the current collector. FIG. 2 is a top view of the current collector, which shows example shape and distribution of the recess structure. It should be understood that the recess structure of the current collector is not limited to cases shown in the figure.

In some embodiments, the recess structure is one main surface of the current collector (the first main surface or the second main surface). In some embodiments, the recess structure is on both the first main surface and the second main surface of the current collector. In an embodiment in which the recess structure is on both the first main surface and the second main surface, the recess structure on the first main surface and the recess structure on the second main surface of the current collector may be provided in a staggered manner. "Staggered manner" means that if a recess structure is provided at a location of the first main surface, no recess structure is provided at a location corresponding to the foregoing location on the second main surface; or vice versa. Such arrangement can effectively prevent the recess structures on the first main surface and the second main surface from being provided at a same position on two sides of the current collector, thereby avoiding that the current collector is too thin or even the current collector is perforated.

In some embodiments, the electrode may be the positive electrode or the negative electrode. Optionally, the electrode is the positive electrode.

The electrode may be a positive electrode and/or negative electrode of secondary battery, for example, a positive electrode and/or negative electrode of lithium-ion battery. However, it should be understood that the electrode is not limited to an electrode of secondary battery. All electrodes whose current collector is improved according to this application shall fall within the scope of this application.

This application further provides a method for preparing the foregoing electrode. The method includes:

providing a current collector, where the current collector includes a first main surface and a second main surface; and forming, on at least one of the first main surface and the second main surface, at least one recess structure that is described above and that extends into interior of the current collector.

In some embodiments, the recess structure is formed in a physical or chemical method. In some embodiments, the recess structure is formed through chemical etching. For example, a current collector with a thickness of 10-50 μm can be used, and a direct current etching process is performed on a surface of the current collector, with a current of 0.1-1.0 A and an energization time of 0.05-3.0s for at least once.

The secondary battery according to this application may be lithium-ion battery, potassium-ion battery, sodium-ion battery, lithium-sulfur battery, or the like.

In some embodiments, the secondary battery is a lithium-ion battery, and the electrolyte includes a lithium salt and an additive, where the lithium salt is selected from at least one of LiFSI, $LiPF_6$, lithium triflate, tetrafluoroborate, and lithium perchlorate, and optionally, at least one of LiFSI and $LiPF_6$. The additive is selected from at least one of the following:

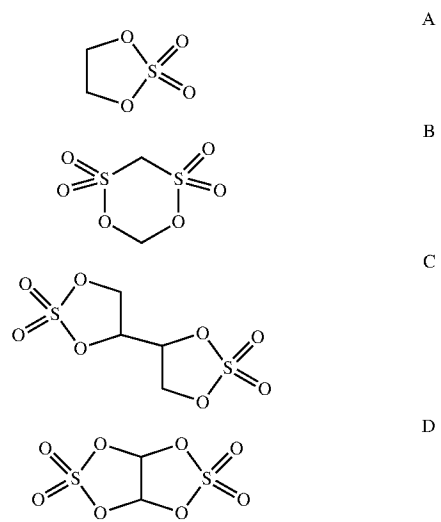

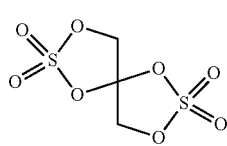

E (?) indicates text missing or illegible when filed

The conductivity of the electrolyte that contains the foregoing lithium salt and additive is high and preferentially forms a highly stable interface film with low impedance at the interface of the cathode and anode in formation and grading process. These characteristics help to improve the cycle life and power performance of cells.

This application further provides a method for preparing the foregoing secondary battery. The method includes:

providing a positive electrode and a negative electrode, where the positive electrode includes a positive electrode current collector having two main surfaces, the negative electrode includes a negative electrode current collector having two main surfaces, at least one of the positive electrode current collector and the negative electrode current collector includes at least one recess structure extending from at least one main surface into interior of the current collector, and the recess structure has a recess depth $h_1$;

disposing a separator between the positive electrode and the negative electrode to form a bare cell; and placing the bare cell in an outer package, and injecting an electrolyte into the outer package, where the electrolyte has a conductivity σ, and numerically, σ and $h_1$ satisfy the following relationship: $8\tanh h_1 + 0.2h_1 \leq \sigma \leq 10\tanh(h_1)^2 + 2 + 0.1h_1$, where the recess depth $h_1$ is in measured in microns, and the conductivity σ of the electrolyte is measured in Siemens/meter.

In the secondary battery of this application, the negative electrode current collector is provided with a negative electrode film layer, the negative electrode film layer includes a negative electrode active material, such as one or more of natural graphite, artificial graphite, soft carbon, hard carbon, silicon current collector material, tin current collector material, and lithium titanate. The silicon current collector material may be selected from one or more of elemental silicon, silicon oxide, and a silicon-carbon composite. The tin current collector material may be selected from one or more of elemental tin, a tin-oxygen compound, and tin alloy.

The negative electrode film layer includes the negative electrode active material, an optional binder, an optional conductive agent, and other optional additives, and is usually formed by a negative electrode slurry applied as a coating and dried. The negative electrode slurry is usually obtained by dispersing the negative electrode active material and the optional conductive agent, binder, and others in a solvent and stirring them to a uniform mixture. The solvent may be N-methylpyrrolidone (NMP) or deionized water.

In an example, the conductive agent may include one or more of superconducting carbon, carbon black (for example, acetylene black or Ketjen black), carbon dots, carbon nanotube, graphene, and carbon nanofiber.

In an example, the binder may include one or more of styrene-butadiene rubber (SBR), water soluble unsaturated resin SR-1B, polyacrylic acid (PAA), polyacrylic acid sodium (PAAS), polyacrylamide (PAM), polyvinyl alcohol (PVA), sodium alginate (SA), and carboxymethyl chitosan (CMCS). In an example, the binder may include one or one of styrene-butadiene rubber (SBR), polyvinyl alcohol (PVA), sodium alginate (SA), polymethacrylic acid (PMAA), and carboxymethyl chitosan (CMCS). The other optional auxiliary agents are, for example, a thickener (for example, sodium carboxymethyl cellulose CMC-Na) and a PTC thermistor material.

In addition, in the secondary battery of this application, the negative electrode plate does not exclude other additional functional layers other than the negative electrode film layer. For example, in some embodiments, the negative electrode plate of this application may further include a conductive primer layer (which is, for example, formed by a conductive agent and a binder) sandwiched between the negative electrode current collector and the negative electrode film layer and disposed on the surface of the negative electrode current collector. In some other embodiments, the negative electrode plate of this application may further include a protective layer covering surface of the negative electrode film layer.

In the secondary battery of this application, the positive electrode current collector is provided with a positive electrode film layer, and the positive electrode film layer includes a positive electrode active material. The positive electrode active material may be selected from $LiNi_{0.5-a}Mn_{1.5}M_aO_4$ (0≤a≤0.1) or $LiNi_xCo_yN_zM_{1-x-y-z}O_2$, with N selected from Mn and Al, and M selected from any one of Co, Ni, Mn, Mg, Cu, Zn, Al, Sn, B, Ga, Cr, Sr, V, and Ti, where 0≤x<1, 0≤y≤1, 0≤z≤1, and x+y+z≤1. For example, the positive electrode active material may include but is not limited to one or more of lithium cobalt oxide ($LiCoO_2$), lithium nickel oxide ($LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel manganese cobalt oxide (for example, $LiNi_{1/3}Co_{1/3}Mn_{1/3}O_2$ (NCM333), $LiNi_{0.5}Co_{0.2}Mn_{0.3}O_2$ (NCM523), $LiNi_{0.5}Co_{0.25}Mn_{0.25}O_2$ (NCM211), $LiNi_{0.6}Co_{0.2}Mn_{0.2}O_2$ (NCM622), and $LiNi_{0.8}Co_{0.1}Mn_{0.1}O_2$ (NCM811)), lithium nickel aluminum cobalt oxide (for example, $LiNi_{0.85}Co_{0.15}Al_{0.05}O_2$), and modified compounds thereof.

The positive electrode film layer further optionally includes a binder. Non-limiting examples of the binder used for the positive electrode film layer may include one or more of the following: polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin. In some embodiments, the positive electrode film layer may further optionally contain a conductive agent. For example, the conductive agent for the positive electrode film layer may include one or more of superconducting carbon, acetylene black, carbon black, Ketjen black, carbon dots, carbon nanotube, graphene, and carbon nanofiber. In an embodiment of this application, the positive electrode may be prepared in the following manner: the foregoing constituents used for preparing positive electrode, for example, the positive electrode active material, conductive agent, binder, and any other constituents, are dispersed in a solvent (for example, N-methylpyrrolidone) to form a uniform positive electrode slurry; and the positive electrode slurry is applied on the positive electrode current collector, followed by processes such as drying and cold pressing to obtain the positive electrode plate.

In the secondary battery of this application, the separator separates an anode side from a cathode side of the secondary battery, and selectively allows transmission or blocks substances of different types, sizes and charges in the system. For example, the separator is an electronic insulator, which physically separates the positive electrode active substance from the negative electrode active material of the secondary battery, thereby preventing internal short circuit and forming an electric field in a given direction, and which allows ions in the battery to move between the positive and negative electrodes through the separator. In an embodiment of this application, a material used for preparing the separator may include one or more of glass fiber, non-woven fabric, polyethylene, polypropylene, and polyvinylidene fluoride. The separator may be a single-layer thin film or a multilayer composite thin film. When the separator is a multilayer composite film, each layer may be made of the same or different materials.

In the secondary battery of this application, the electrolyte may be selected from at least one of a solid electrolyte and a liquid electrolyte (or electrolyte solution). In some embodiments, the electrolyte is a liquid electrolyte. The electrolyte solution includes an electrolytic salt and a solvent. In some embodiments, the electrolytic salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bis(fluorosulfonyl)imide), LiTFSI (lithium bistrifluoromethanesulfonimide), LiTFS (lithium trifluoromethanesulfonate), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate). In an embodiment of this application, the solvent may be selected from one or more of the following: ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methyl sulfone (EMS), and diethyl sulfone (ESE). In an embodiment of this application, based on a total weight of the electrolyte, a proportion of the solvent is 60-99 wt %, for example, 65-95 wt %, or 70-90 wt %, or 75-89 wt %, or 80-85 wt %. In an embodiment of this application, based on a total weight of the electrolyte, a proportion of the electrolytic salt is 1-40 wt %, for example, 5-35 wt %, or 10-30 wt %, or 11-25 wt %, or 15-20 wt %.

In an embodiment of the secondary battery of this application, the electrolyte may further optionally include an additive. For example, the additive may include one or more of the following: a negative electrode film forming additive, a positive electrode film forming additive, or may include an additive capable of improving some performance of batteries, for example, an additive for improving over-charge performance of batteries, an additive for improving high-temperature performance of batteries, and an additive for improving low-temperature performance of batteries.

In an embodiment of this application, the positive electrode, the negative electrode, and the separator may be made into an electrode assembly/bare cell through winding or lamination.

In an embodiment of this application, the secondary battery may include an outer package. The outer package may be used for packaging the electrode assembly and the electrolyte/electrolyte solution. In some embodiments, the outer package of the secondary battery may be a hard shell, for example, a hard plastic shell, an aluminum shell, or a steel shell. In some other embodiments, the outer package of the secondary battery may alternatively be a soft pack, for example, a soft pouch. A material of the soft pack may be plastic, for example, one or more of polypropylene (PP), polybutylene terephthalate (PBT), polybutylene succinate (PBS), and the like.

Figure 3:
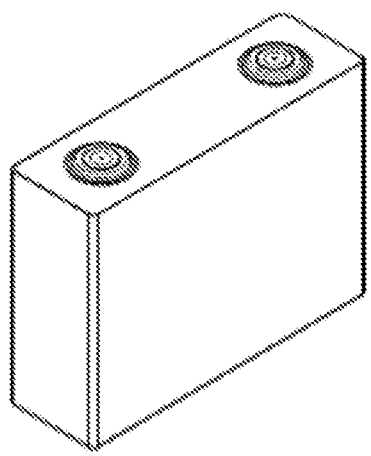
FIG. 3 is a schematic diagram of an embodiment of a secondary battery according to this application.
Figure 4:
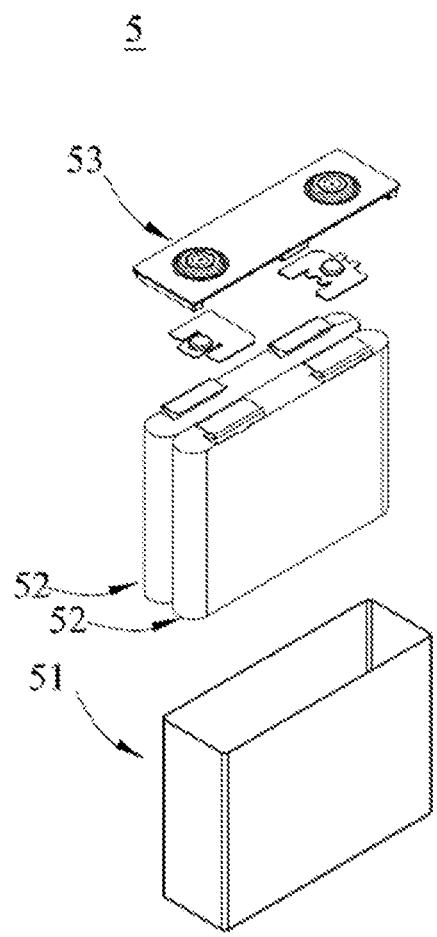
FIG. 4 is an exploded view of the secondary battery in FIG. 3.

The secondary battery in this application may be cylindrical, rectangular, or of any other shapes. FIG. 3 shows a rectangular secondary battery 5 as an example. FIG. 4 is an exploded view of the secondary battery 5 in FIG. 3. The outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 can cover the opening to close the accommodating cavity. A positive electrode plate, a negative electrode plate, and a separator may be made into an electrode assembly 52 through winding or lamination. The electrode assembly is packaged in the accommodating cavity, and the electrolyte infiltrates the electrode assembly 52. The secondary battery 5 may include one or more electrode assemblies 52.

Battery Module, Battery Pack, and Electric Apparatus

In an embodiment of this application, several secondary batteries may be assembled together to form a battery module, and the battery module includes two or more secondary batteries described in this application, and the specific number depends on application of the battery module and a parameter of an individual battery module.

Figure 5:
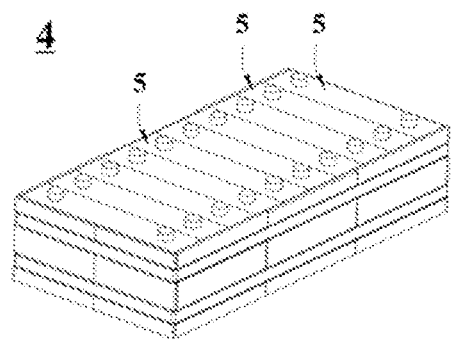
FIG. 5 is a schematic diagram of an embodiment of a battery module according to this application.

FIG. 5 shows a battery module 4 as an example. With reference to FIG. 5, in the battery module 4, a plurality of secondary batteries 5 may be sequentially arranged in a length direction of the battery module 4. Certainly, the batteries may alternatively be arranged in any other manners. Further, the plurality of secondary batteries 5 may be fastened through fasteners.

Optionally, the battery module 4 may further include a housing with accommodating space, and the plurality of secondary batteries 5 are accommodated in the accommodating space.

In an embodiment of this application, two or more battery modules as described above may be further assembled into a battery pack, and the number of battery modules included in the battery pack depends on application of the battery pack and a parameter of an individual battery module. The battery pack may include a battery box and a plurality of battery modules arranged in the battery box. The battery box includes an upper box body and a lower box body. The upper box body can cover and well match the lower box body to form an enclosed space for accommodating the battery modules. Two or more battery modules may be arranged in the battery box as required.

Figure 6:
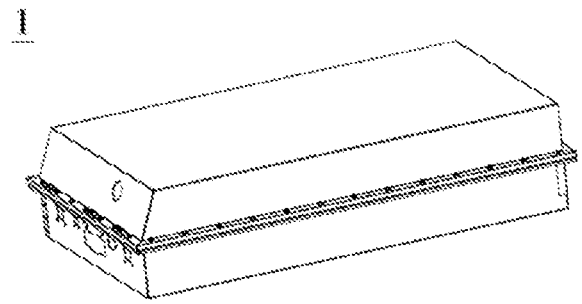
FIG. 6 is a schematic diagram of an embodiment of a battery pack according to this application.
Figure 7:
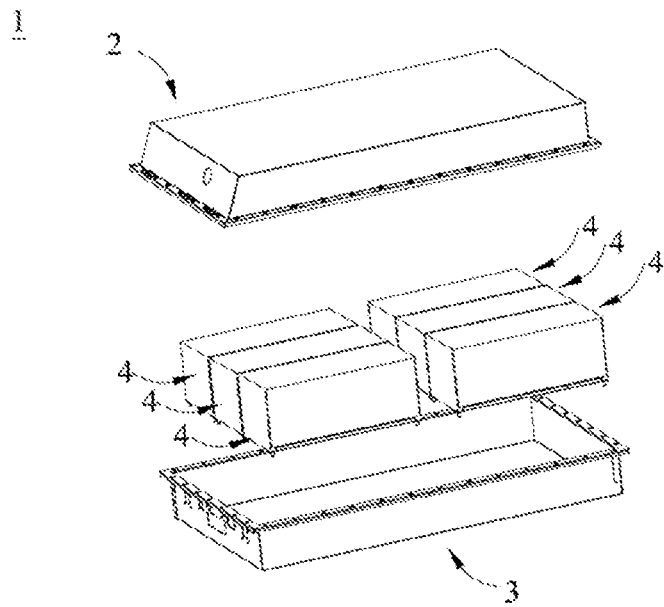
FIG. 7 is an exploded view of the battery pack in FIG. 6.

FIG. 6 and FIG. 7 show a battery pack 1 as an example. Referring to FIG. 6 and FIG. 7, the battery pack 1 may include a battery box and a plurality of battery modules 4 arranged in the battery box. The battery box includes an upper box body 2 and a lower box body 3. The upper box body 2 is configured to cover the lower box body 3 to form enclosed space for accommodating the battery modules 4. The plurality of battery modules 4 may be arranged in the battery box in any manner.

In an embodiment of this application, the electric apparatus of this application includes at least one of the secondary battery, the battery module, or the battery pack of this application. The secondary battery, the battery module, or the battery pack may be used as a power source for the electric apparatus, or an energy storage unit of the electric apparatus. The electric apparatus includes but is not limited to a mobile digital apparatus (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

Figure 8:
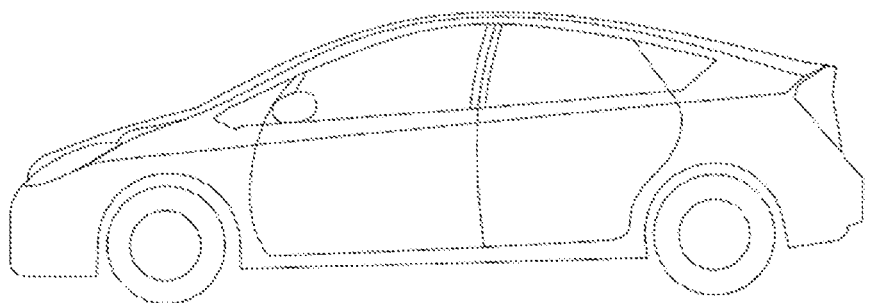
FIG. 8 is a schematic diagram of an embodiment of an apparatus using the secondary battery in this application as a power source.

FIG. 8 shows an apparatus as an example. The apparatus is a battery electric vehicle, a hybrid electric vehicle, or a plug-in hybrid electric vehicle, or the like. To satisfy requirements of the apparatus for high power and high energy density, a battery pack or a battery module may be used.

In another example, the apparatus may be a mobile phone, a tablet computer, a notebook computer, or the like. The apparatus usually requires to be light and thin, and a secondary battery may be used as a power source.

Technical Effect

In this application, the recess structure is provided on the current collector of the electrode, and a particle size of the electrode active material of the recess structure and/or disposed on the current collector is properly adjusted, or the conductivity of the recess structure and the electrolyte is properly adjusted, unexpectedly improving cycle life and battery performance of batteries.

This application includes but is not limited to the following beneficial technical effects:
(1) A bite force between electrode active material particles and current collectors is improved, the electrode active material particles better match recess structures, and it is avoided that passivation films on the surface of current collectors are damaged due to compressing of active material particles against the current collector during cold pressing, effectively suppressing or avoiding fall-off of electrode active material particles in the middle and late stages of cycling, substantially suppressing fall-off active materials in long-term cycling in particular.
(2) Active material particles are in good effective contact with current collectors so that electrons can be quickly conducted, thereby reducing polarization of electrodes and improving service life of cells.
(3) The shortcoming of long transmission path for lithium ions caused by recess structures is effectively compensated for, helping rapid transmission of electrons, and improving power performance of cells.

EXAMPLES

The present invention is further described below in detail with reference to examples. It should be understood that these examples are merely intended for illustration but not to limit the scope of the present invention.

In the following examples and comparative examples, all reagents, materials, and instruments used are commercially available or synthesized unless otherwise specified.

Examples 1 to 25 and Comparative Example 1

1. Preparation of Electrolyte

In a glove box full of argon (with water proportion <10 ppm and oxygen proportion <1 ppm), ethylene carbonate (EC), dimethyl carbonate (DMC), methyl ethyl carbonate (EMC) were well mixed at a ratio (mass ratio) of 1:1:1, an appropriate amount of lithium salts LiFSI and $LiPF_6$ was slowly added in the resulting non-aqueous organic solvent, and after the lithium salts were completely dissolved, 1 wt % vinyl sulfate (DTD) was added to obtain an electrolyte with a lithium salt concentration of 1 mol/L (0.1M LiFSI+ 0.9M $LiPF_6$).

2. Preparation of Positive and Negative Electrode Current Collectors

Except that no recess structure was made on a positive electrode current collector aluminum foil in Comparative Example 1, based on parameters shown in table 1 below, a recess structure with a semicircular cross section was made on front and back main surfaces of positive electrode current collectors aluminum foil in an electrochemical etching method. The aluminum foil used had a thickness ($h_2$) of 18 µm and a width of 80 mm. In Table 1, d represents a minimum distance between a region in which the recess structure is distributed on the surface of the aluminum foil and the edge of the aluminum foil, and is measured with a scale; $A_1$ represents a recess area, $A_2$ indicates a surface area of the aluminum foil; $h_1$ represents a recess depth, and $h_2$ represents a thickness of the aluminum foil. They are obtained through online measurement from section analysis performed for current collectors in accordance with JY/T010-1996, W indicates a recess width and is obtained through surface morphology analysis performed in accordance with JY/T010-1996; D90 indicates a D90 particle size of electrode active material particles and is measured in accordance with GB/T19077-2016; and "√" indicates that double-surface staggered etching is used and "x" indicates that staggered etching is not used on two sides.

A copper foil with a thickness of 18 µm and a width of 80 mm was used as the negative electrode current collector.

TABLE 1

Parameters for aluminum foil preparation in Examples 1 to 25 and Comparative Example 1

| | d (mm) | $A_1/A_2$ | $h_1$ (µm) | $h_1/h_2$ | W (µm) | D90 (µm) | Staggered | Conductivity of electrolyte at 25° C. |
|---|---|---|---|---|---|---|---|---|
| Example 1 | 0.9 | 0.4 | 5.4 | 0.3 | 10 | 6 | ✓ | 10.9 |
| Example 2 | 1 | 0.4 | 5.4 | 0.3 | 10 | 6 | ✓ | 9.5 |
| Example 3 | 3 | 0.4 | 5.4 | 0.3 | 10 | 6 | ✓ | 9.3 |
| Example 4 | 10 | 0.4 | 5.4 | 0.3 | 10 | 6 | ✓ | 9.6 |

TABLE 1-continued

Parameters for aluminum foil preparation in Examples 1 to 25 and Comparative Example 1

| | d (mm) | $A_1/A_2$ | $h_1$ (μm) | $h_1/h_2$ | W (μm) | D90 (μm) | Staggered | Conductivity of electrolyte at 25° C. |
|---|---|---|---|---|---|---|---|---|
| Example 5 | 11 | 0.4 | 5.4 | 0.3 | 10 | 6 | ✓ | 10.1 |
| Example 6 | 3 | 0.16 | 5.4 | 0.3 | 5 | 5.5 | ✓ | 11.4 |
| Example 7 | 3 | 0.2 | 5.4 | 0.3 | 10 | 6 | ✓ | 10.0 |
| Example 8 | 3 | 0.6 | 5.4 | 0.3 | 10 | 6 | ✓ | 10.6 |
| Example 9 | 3 | 0.8 | 5.4 | 0.3 | 10 | 6 | ✓ | 12.0 |
| Example 10 | 3 | 0.85 | 5.4 | 0.3 | 5 | 5.5 | ✓ | 11.9 |
| Example 11 | 3 | 0.4 | 1.44 | 0.08 | 6 | 5 | ✓ | 7.5 |
| Example 12 | 3 | 0.4 | 1.8 | 0.1 | 7 | 5 | ✓ | 8.0 |
| Example 13 | 3 | 0.4 | 9.0 | 0.5 | 10 | 9 | ✓ | 12.5 |
| Example 14 | 3 | 0.4 | 10.8 | 0.6 | 20 | 14 | ✓ | 13.0 |
| Example 15 | 3 | 0.4 | 1.8 | 0.1 | 1.8 | 1.8 | ✓ | 8.0 |
| Example 16 | 3 | 0.4 | 1.8 | 0.1 | 4 | 3 | ✓ | 8.5 |
| Example 17 | 3 | 0.4 | 1.8 | 0.1 | 6 | 4 | ✓ | 8.7 |
| Example 18 | 3 | 0.4 | 1.8 | 0.1 | 10.8 | 6 | ✓ | 10.8 |
| Example 19 | 3 | 0.4 | 1.8 | 0.1 | 11 | 6 | ✓ | 8.2 |
| Example 20 | 3 | 0.4 | 5.4 | 0.3 | 10 | 10 | ✓ | 10.4 |
| Example 21 | 3 | 0.4 | 5.4 | 0.3 | 10 | 8 | ✓ | 10.7 |
| Example 22 | 3 | 0.4 | 5.4 | 0.3 | 10 | 5.4 | ✓ | 11.6 |
| Example 23 | 3 | 0.4 | 5.4 | 0.3 | 10 | 12 | ✓ | 9.3 |
| Example 24 | 3 | 0.4 | 5.4 | 0.3 | 10 | 5 | ✓ | 9.8 |
| Example 25 | 3 | 0.4 | 5.4 | 0.3 | 10 | 6 | x | 10.4 |
| Comparative Example 1 | / | / | / | / | / | 6 | / | 8.0 |

3. Preparation of Positive Electrode Plate

A positive electrode active material $LiNi_{0.8}Co_{0.1}Mn_{0.1}O_2$, a conductive agent Super P carbon black, and a binder polyvinylidene fluoride (PVDF) were prepared into a positive electrode slurry in N-methylpyrrolidone (NMP). A solid content of the positive electrode slurry was 50 wt %, and a mass ratio of $LiNi_{0.8}Co_{0.1}Mn_{0.1}O_2$, Super P, and PVDF in the solid was 8:1:1. The positive electrode slurry was applied on a current collector aluminum foil, and the resulting current collector was dried at 85° C. and cold pressed, followed by trimming, cutting, slitting, and drying under a vacuum condition at 85° C. for 4 h, to prepare a positive electrode plate.

4. Preparation of Negative Electrode Plate

A negative electrode active material graphite, a conductive agent Super P carbon black, a thickener carboxymethyl cellulose (CMC), and a binder butadiene styrene rubber (SBR) were well mixed in deionized water to prepare a negative electrode slurry. A solid content of the negative electrode slurry was 30 wt %, and a mass ratio of carbon black, Super P, CMC, and SBR in the solid was 80:15:3:2. The negative electrode slurry was applied on a current collector copper foil, and the resulting current collector was dried at 85° C., followed by cold pressing, trimming, cutting, slitting, and drying under a vacuum condition at 120° C. for 12 h, to prepare a negative electrode plate.

5. Preparation of Lithium-Ion Battery

A polypropylene film (PE) with a thickness of 16 μm was used as a separator. The prepared positive electrode plate, the separator, and the negative electrode plate were stacked in order so that the separator was sandwiched between the positive electrode plate and the negative electrode plate for isolation, and then the stack was wound to obtain a bare cell. Tabs were welded. The bare cell was placed in an outer package. The prepared electrolyte was injected into the dried cell, followed by packaging, standing, formation, and shaping, capacity testing, and the like to complete preparation of lithium-ion battery (the pouch lithium-ion battery has a thickness of 4.0 mm, a width of 60 mm, and a length of 140 mm).

Next, a test procedure for the lithium-ion battery is as follows.

1. Cycling Performance of Lithium-Ion Battery

At 25° C., the battery was charged to 4.25 V at a constant current of 1C, charged to 0.05C at a constant voltage, and then discharged to 2.8 V at 1C. A first-cycle discharge capacity C1 was recorded. The foregoing operations were repeated to obtain a discharge capacity Cn of the 200-th cycle, and a rate capacity retention rate was equal to C1/Cn*100%.

2. Power Performance of Lithium-Ion Battery

At room temperature, the lithium-ion battery was charged to 4.25 V at a constant current of 1C, and charged to a current of 0.05C at a constant voltage. After being fully charged, the battery was left standing for 5 min, discharged for 30 min at 1C (a state of charge of the cell is 50% SOC (state of charge)), and left standing for 5 min. The temperature was adjusted to 25° C., and the battery was left standing for 1 h. A voltage V1 of the cell at this time was recorded. The battery was discharged at 0.4C for 15 s, and a voltage V2 after pulse discharge was recorded. A direct current resistance DCR of the cell is equal to (V1−V2)/I when the cell reached 50% SOC, where I=0.4C.

For test results, refer to Table 2.

TABLE 2

Performance characterization results of batteries of Examples 1 to 25 and Comparative Example 1

| Battery number | Cycling performance of battery | DCR at room temperature (mΩ) |
|---|---|---|
| Example 1 | 84.20% | 56 |
| Example 2 | 98.60% | 18 |
| Example 3 | 99.30% | 10 |

TABLE 2-continued

Performance characterization results of batteries of Examples 1 to 25 and Comparative Example 1

| Battery number | Cycling performance of battery | DCR at room temperature (mΩ) |
|---|---|---|
| Example 4 | 99.00% | 13 |
| Example 5 | 91.30% | 41 |
| Example 6 | 81.30% | 60 |
| Example 7 | 98.80% | 14 |
| Example 8 | 99.50% | 8 |
| Example 9 | 99.10% | 16 |
| Example 10 | 84.60% | 53 |
| Example 11 | 85.10% | 50 |
| Example 12 | 98.00% | 26 |
| Example 13 | 98.30% | 23 |
| Example 14 | 86.60% | 46 |
| Example 15 | 96.90% | 34 |
| Example 16 | 97.30% | 30 |
| Example 17 | 97.70% | 28 |
| Example 18 | 97.10% | 32 |
| Example 19 | 85.60% | 51 |
| Example 20 | 98.90% | 15 |
| Example 21 | 99.50% | 9 |
| Example 22 | 99.00% | 13 |
| Example 23 | 90.10% | 38 |
| Example 24 | 96.40% | 37 |
| Example 25 | 80.10% | 65 |
| Comparative Example 1 | 83.10% | 57 |

Examples 26 to 29 and Comparative Example 2

The electrolyte and the aluminum foil positive electrode current collector with a recess structure were prepared according to the method described in "Examples 1 to 25 and Comparative Example 1", except that the conductivity σ of the electrolyte and the depth $h_1$ of the recess structure are as shown in Table 3 below. The positive electrode plate, the negative electrode plate, and the lithium-ion battery were prepared according to the method described in "Examples 1 to 25 and Comparative Example 1", and the cycling performance and power performance of the lithium-ion battery were tested in the same method. The results are shown in Table 4. The conductivity of the electrolyte may be determined by adjusting the type and amount of the solvent and lithium salt. Details are given in Table 5. The conductivity of the electrolyte was measured according to HG-T 4067-2015.

TABLE 3

Parameters of aluminum foil recess structure and electrolyte in Examples 26 to 29 and Comparative Example 2

| | Depth $h_1$ of recess structure (μm) | Conductivity of electrolyte σ (mS/cm) |
|---|---|---|
| Example 26 | 0.9 | 7.5 |
| Example 27 | 2 | 10 |
| Example 28 | 4 | 11 |
| Example 29 | 9 | 12 |
| Comparative Example 2 | 0.9 | 5 |

TABLE 4

Performance characterization results of batteries of Examples 26 to 29 and Comparative Example 2

| | Cycling performance of battery | DCR at room temperature (mΩ) |
|---|---|---|
| Example 26 | 98.9% | 21 |
| Example 27 | 99.3% | 16 |
| Example 28 | 99.5% | 17 |
| Example 29 | 98.0% | 27 |
| Comparative Example 2 | 83.2% | 41 |

TABLE 5

Type and amount of solvent and lithium salt in electrolyte of Examples 26 to 29 and Comparative Example 2

| | Ethylene carbonate (EC) (g) | Dimethyl carbonate (DMC) (g) | Ethyl methyl carbonate (EMC) (g) | Lithium hexafluorophosphate (LiPF$_6$) (g) | Lithium bis(fluorosulfonyl)imide (LiFSI) (g) | Conductivity at room temperature (S/m) |
|---|---|---|---|---|---|---|
| Example 26 | 18.75 | | 75 | 6.25 | | 7.5 |
| Example 27 | 37.5 | | 56.25 | 6.25 | | 10 |
| Example 28 | 26.25 | 43.75 | 17.5 | 12.5 | | 11 |
| Example 29 | 25.38 | 42.3 | 16.92 | | 15.4 | 12 |
| Comparative Example 2 | | | 84.6 | | 15.4 | 5 |

In Examples 26 to 29, the depth $h_1$ of the recess structure on the aluminum foil and the conductivity σ of the electrolyte satisfy $8\tanh h_1 + 0.2h_1 \leq \sigma \leq 10\tanh(h_1)^2 + 2 + 0.1h_1$. The results show that when the depth $h_1$ of the recess structure on the current collector and the conductivity σ of the electrolyte satisfy the foregoing relationship, the cycling performance and power performance of the lithium-ion battery are significantly improved, thereby improving the cycle life and overall performance of the battery. Without wishing to be bound by any particular theory, it is believed that electrode active material particles are partially being embedded in the recess structure of the current collector does not help with rapid infiltration of the electrolyte, that is, does not help with migration of lithium ions in the solid phase, and that adjusting the conductivity of the electrolyte (adjusting the transmission speed of lithium ions in the electrolyte) helps to alleviate problems caused by the foregoing recess structure.

Although this application has been described with reference to the embodiments, various modifications can be made to this application without departing from the scope of this application and the components therein can be replaced with their equivalents. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A secondary battery, comprising a positive electrode, a negative electrode, a separator sandwiched between the positive electrode and the negative electrode, and an electrolyte, wherein the positive electrode comprises a positive electrode current collector having two main surfaces, the negative electrode comprises a negative electrode current collector having two main surfaces, and at least one of the positive electrode current collector and the negative electrode current collector comprises at least one recess structure extending from at least one main surface into interior of the current collector, wherein the recess structure has a recess depth $h_1$ in microns, the electrolyte has a conductivity σ in Siemens/meter, and numerically, σ and $h_1$ satisfy the following relationship: $8\tanh h_1 + 0.2h_1 \leq \sigma \leq 10 \tanh(h_1)^2 + 2 + 0.1h_1$.

2. The secondary battery according to claim 1, wherein a relationship between the recess depth $h_1$ of the recess structure and thickness $h_2$ of the current collector at which the recess structure is located is:

$$0.10 \leq \frac{h_1}{h_2} \leq 0.50,$$

wherein the recess depth $h_1$ and the thickness $h_2$ of the current collector are expressed in a same unit.

3. The secondary battery according to claim 1, wherein the recess structure has a recess width W, and a relationship between the recess width W and the recess depth $h_1$ is $h_1 \leq W \leq 6h_1$, wherein the recess width W is a linear distance between two points with a largest linear distance on periphery of a cross section that is of the recess structure and that intersects with a main surface of the current collector at which the recess structure is located, and the recess width W and the recess depth $h_1$ are expressed in a same unit.

4. The secondary battery according to claim 1, wherein the current collector is provided with an electrode active material, and a relationship between a particle size D90 of the electrode active material of the current collector and the recess depth $h_1$ and the recess width W of the recess structure of the current collector is: $h_1 \leq D90 \leq W$, wherein the particle size D90, the recess depth $h_1$, and the recess width W are expressed in a same unit.

5. The secondary battery according to claim 1, wherein a relationship between a recess area $A_1$ of the recess structure and a surface area $A_2$ of the current collector at which the recess structure is located is:

$$0.2 \leq \frac{A_1}{A_2} \leq 0.8,$$

wherein the recess area $A_1$ is a sum of areas of cross sections of all recess structures on the current collector intersecting with the main surface of the current collector, and the recess area $A_1$ and the surface area $A_2$ of the current collector are expressed in a same unit.

6. The secondary battery according to claim 1, wherein a minimum distance d between a region in which the recess structure is distributed on the surface of the current collector and edge of the current collector satisfies $1 \text{ mm} \leq d \leq 10 \text{ mm}$.

7. The secondary battery according to claim 1, wherein the current collector is selected from aluminum foil and copper foil.

8. The secondary battery according to claim 1, wherein the two main surfaces of the current collector both have a recess structure.

9. The secondary battery according to claim 8, wherein the recess structures on the two main surfaces are disposed in a staggered manner.

10. The secondary battery according to claim 1, wherein the recess depth $h_1$ is between 0.9-9.0 μm.

11. The secondary battery according to claim 10, wherein the recess path $h_1$ is 1-8 μm.

12. The secondary battery according to claim 11, wherein the recess path $h_1$ is 2-7 μm.

13. The secondary battery according to claim 1, wherein the positive electrode current collector comprises a recess structure extending from at least one main surface thereof into interior of the positive electrode current collector.

14. The secondary battery according to claim 13, wherein the positive electrode current collector comprises recess structures extending from the two main surfaces thereof into interior of the positive electrode current collector, and the recess structures on the two main surfaces are optionally disposed in a staggered manner.

15. The secondary battery according to claim 1, wherein the secondary battery is a lithium-ion battery, and the electrolyte comprises a lithium salt and an additive, wherein the lithium salt is selected from at least one of LiFSI, $LiPF_6$, lithium triflate, tetrafluoroborate, and lithium perchlorate, and optionally, at least one of LiFSI and $LiPF_6$.

16. The secondary battery according to claim 15, wherein the additive is selected from at least one of the following:

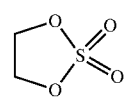

A

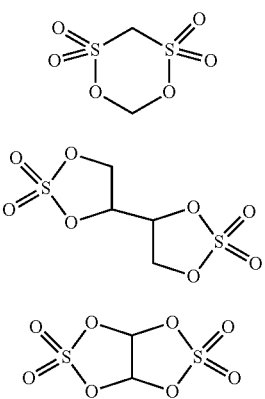
17. A battery module, comprising the secondary battery according to claim 1.
18. A battery pack, comprising the battery module according to claim 17.
19. An electric apparatus, comprising at least one of the secondary battery according to claim 1, the battery module according to claim 17, and the battery pack according to claim 18.
* * * * *